United States Patent [19]

Winters et al.

[11] 4,256,216

[45] Mar. 17, 1981

[54] APPARATUS FOR EJECTING OBJECTS FROM A CONVEYOR LINE

[75] Inventors: Thomas B. Winters, Raymond; Jim H. Priday, Plain City, both of Ohio

[73] Assignee: Societe d'Assistance Technique pour Produits Nestle S.A., Lausanne, Switzerland

[21] Appl. No.: 23,039

[22] Filed: Mar. 23, 1979

[51] Int. Cl.³ .................................................. B07C 9/00
[52] U.S. Cl. ................................. 198/488; 198/367; 198/372; 198/598
[58] Field of Search ............... 209/596, 657, 651, 652, 209/653, 552; 198/367, 372, 487, 598, 488

[56] References Cited

U.S. PATENT DOCUMENTS

| | | | |
|---|---|---|---|
| 3,179,228 | 4/1965 | Mumford | 198/372 |
| 3,324,302 | 6/1967 | Orr et al. | 209/653 X |
| 3,666,093 | 5/1972 | Thornton | 209/652 X |

Primary Examiner—Allen N. Knowles
Attorney, Agent, or Firm—Watson, Leavenworth, Kelton & Taggart

[57] ABSTRACT

On a conveyor belt, an ejection mechanism ejects objects travelling thereon which do not fulfill predetermined requirements as detected by a detecting device. To speed up the return of the ejection mechanism to its home position, the ejection cycle is divided into several movements. First a striking element is propelled against the object to be ejected, then the striking mechanism pivots on a fixed point to bring the striking element out of the path of the objects. Next the striking element is retracted and the ejection mechanism pivots back to its original position. A locking device may be used to retain the ejection mechanism in the deflected position to ensure that the striking element is completely retracted before the ejection mechanism pivots back to the home position.

10 Claims, 9 Drawing Figures

APPARATUS FOR EJECTING OBJECTS FROM A CONVEYOR LINE

This invention relates to a sorting device in which three-dimensional objects pass one by one through the field of a detecting device and are ejected as a result of a signal from the detecting device. This ejection takes place by means of an ejecting mechanism comprising at least one motor element firmly mounted on a fixed base and a retractable striking element impelled by the motor element. The invention also relates to an application of the sorting device according to the invention.

Devices of the type described above are well known to the art, particularly for handling finished products. The invention is however not limited to this application. The term "ejection" should be understood in the widest sense of the word. The main meaning is that the ejected object does not follow the direction taken by the other objects that, having passed through the detector field, have not triggered off the ejection signal. The ejected objects may, for example, be simply set on one side to remain in an appropriate container, or they may be caused to follow a path parallel to the other objects. The detector may be one of many varying kinds and react to a specific characteristic of the objects to be sorted such as, for example, containers that do not fall within prescribed weight limits, or the absence of some component or element, such as a lid, or a label, etc., of the presence or absence of some distinctive feature.

The term "three-dimensional object" covers any object that can be placed on a moving bearing surface, such as an endless band or conveyor belt, etc., and that rise sufficiently above the moving surface for a striking element to eject them from the line of travel. It goes without saying that the objects should be capable of resisting such shocks as they may receive during ejection.

Known devices of this kind have the disadvantage of considerably slowing down the production line on which they are placed. It is particularly the return movement of the striking instrument that slows down the operation.

The present invention seeks to speed up the sorting process and proposes a new sorting device that eliminates the drawbacks of previous devices. The device as hereinafter described and claimed makes it possible considerably to speed up the sorting process, while remaining reliable and efficient in operation.

The following is a description, by way of example only and with reference to the accompanying drawings, which illustrate only one possible embodiment of the present invention.

Figure 1:
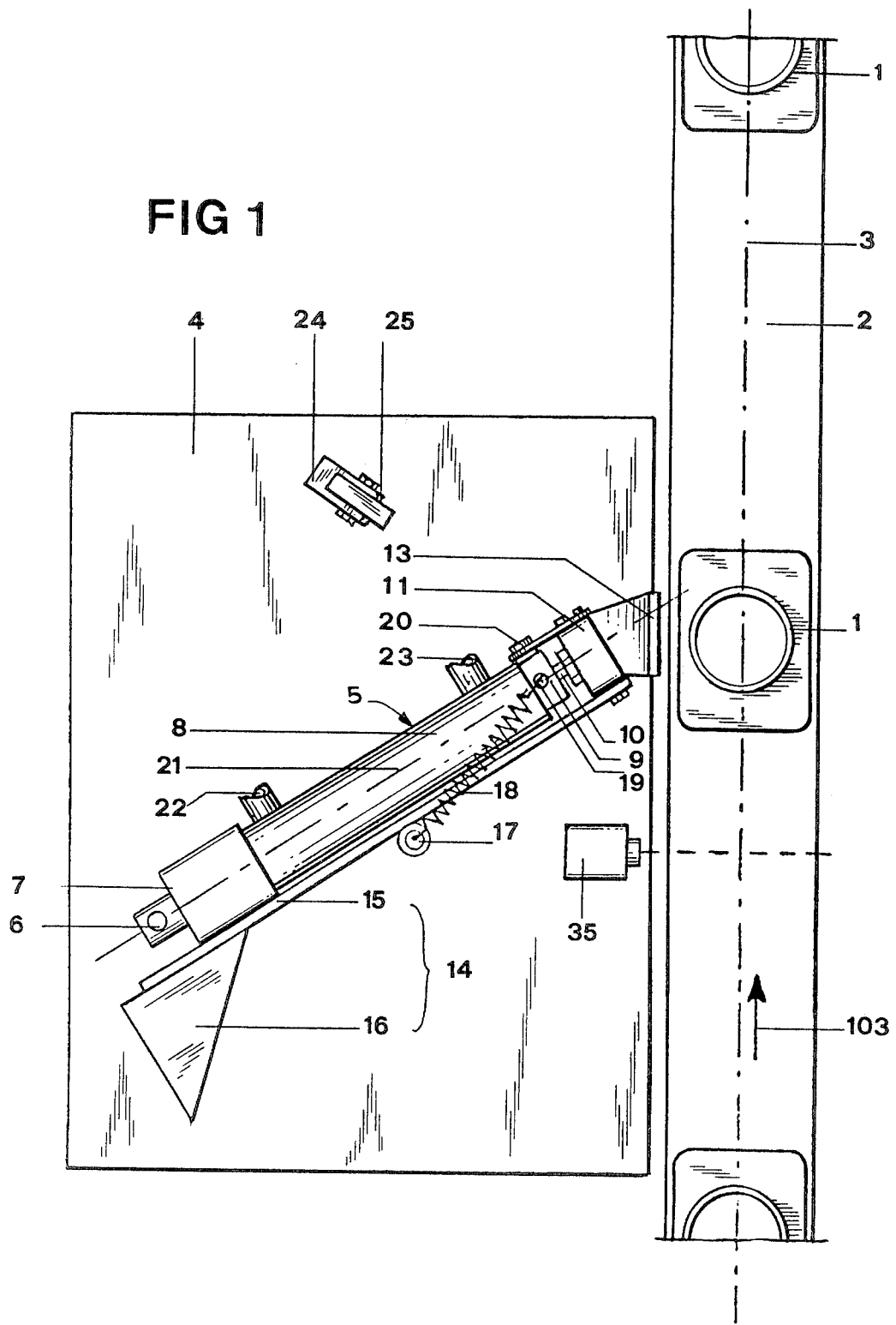
FIGS. 1 to 4 are diagrammatic views of a sorting device according to the invention, seen from above at different stages of the sorting operation.
Figure 2:
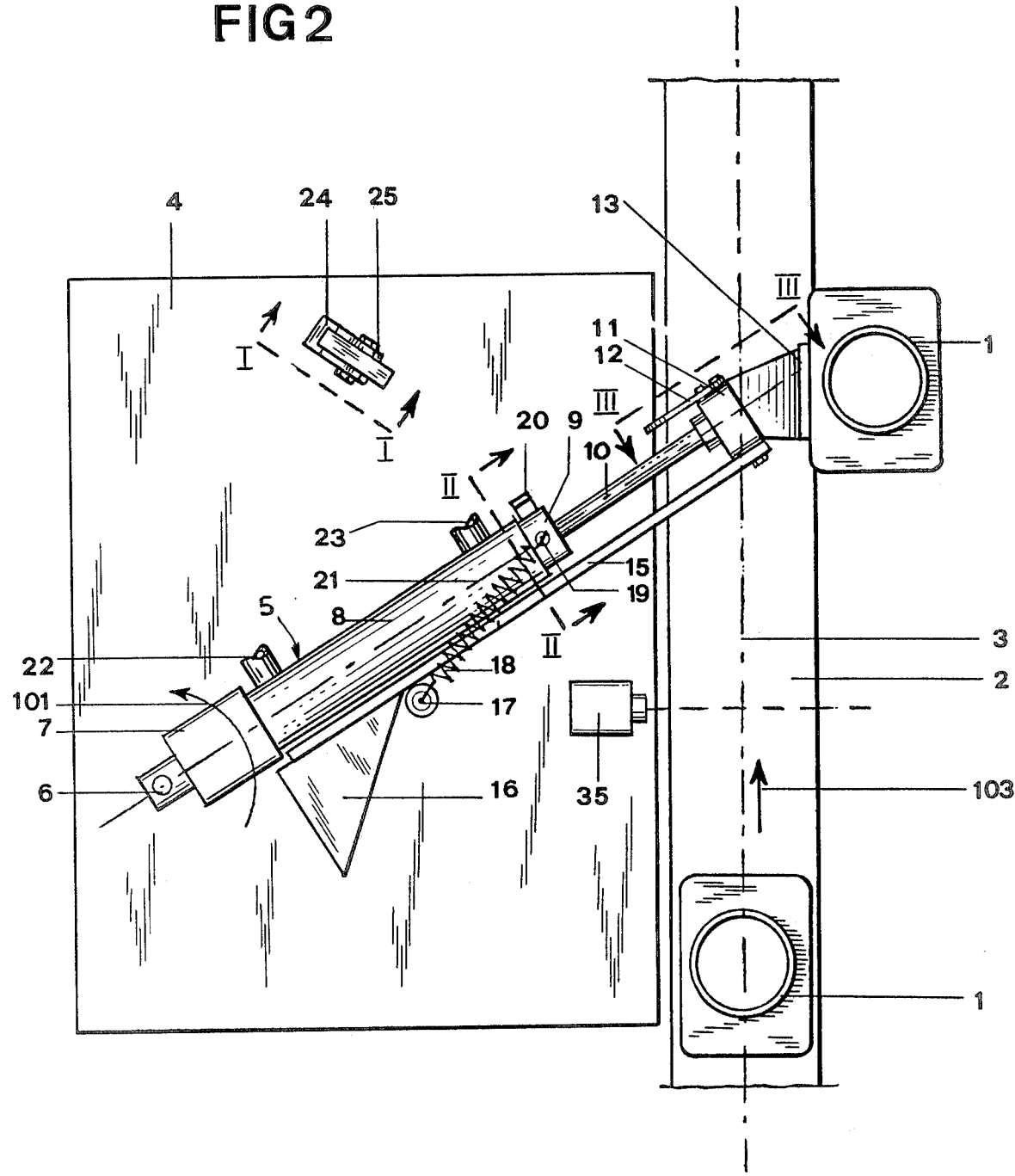

As will be seen from FIG. 1, the objects 1 to be sorted are carried on an endless band or conveyor belt 2. The path followed by the objects 1 is indicated by the broken line 3 and their direction of travel by the arrow 103. The bearing surface of the belt 2 may be horizontal or inclined; hereinafter, for the sake of simplicity of description, the surface is taken to be horizontal. Moving along line 3, the objects 1 pass through the field of the detector 35 which detects the presence or absence of a specific distinctive feature of the objects 1. If detector 35 does not signal a defect while the objects 1 are passing through the field, the objects 1 continue along line 3. In the case of defect, the objects 1 are ejected from the conveyor 2, as shown in FIG. 2. The ejected objects fall into an appropriate container or else are pushed onto another conveyor in spaced relationship to the first. (N.B. Neither the container nor the second conveyor are shown in the drawings as they have no bearing on the sorting device of the present invention.)

The ejection mechanism 5 comprises a motor element 7-10 and a striking element 13. The motor element 7-10 is mounted on a stable base 4 placed beside the conveyor belt 2. Upstanding from the base 4 is a post 6 perpendicular to the plane which comprises the conveyor belt 2. The ejection mechanism 5 is pivotally mounted on the post 6 in a substantially horizontal plane. In other embodiments of the invention, the motor element 7-10 may be mounted on a ball joint so that the pivotal movement around post 6 might take place in other planes.

The motor element 7-10 that has been chosen to illustrate this particular embodiment of the invention is of the conventional type of cylinder and piston. In the present case it is assumed to be of a pneumatic type. The two chambers of the cylinder are connected to compressed air inlet and outlet lines 22 and 23. The equipment for the compressed air is also of conventional type and not shown in the illustrations. Instead of a pneumatic cylinder and piston system, the motor could equally well be powered by a liquid fluid, or electricity or any other form of energy. In the case of electricity being used, the motive force could be an electro-magnet.

In the form of embodiment chosen, using cylinder and piston, the motor element comprising the cylinder having a base 7, a body 8 and a head 9. Of the piston 10, the drawings show only the rod which bears a rectangular-shaped head 11. The striking element 13 is co-substantial with it. The longitudinal axis 21 of the cylinder 8 corresponds to the trajectory of the striking element 13 relative to the motor element 7-10. The base 7 of the cylinder is designed to be pivotally mounted on the post 6, so that the whole ejection mechanism 5 pivots on the post 6. The travel is limited in both directions by stop-pieces 17 and 24 upstanding from the base 4 on either side of the ejection mechanism 5. A return spring 18 extends between a lug 19 on the head 9 of the cylinder and the stop-pin 17. It serves to return the mechanism 5 to its home position against the stop-pin 17. In the home position, the striking element 13 is retracted out of the path 3 of the objects 1.

On the stop-pin 17 side of the head 11 is fixed a guide 14 which runs substantially parallel to the body 8 of the cylinder, between the motor element 7-10 and the stop-pin 17, against which it is pressed by the return spring 18. The stop-pin 17 may be fitted with a roller to facilitate the movement of the guide 14 against it. The guide 14 comprises two surfaces 15 and 16: the first surface 15 is substantially straight and lies in spaced parallel relation to the longitudinal axis 21 of the cylinder 8; the second surface 16 is constituted by an inclined plane or curve at an obtuse angle to the first surface 15. The junction between the two surfaces 15 and 16 is situated at a specific point which will be defined hereinafter with reference to FIG. 3.

The position of the stop-pin 17 in relation to the post 6 on the base 4 is chosen so that, when the ejection mechanism is in the home position, the longitudinal axis 21 forms an acute angle with the path 3 of the objects 1. Thus the striking action of the ejection mechanism 5 is directed obliquely in relation to the path 3 and in the direction of travel of the objects 1. For the ejection mechanism 5 to work, inlet 22 has to be connected to a source of compressed air. On a signal from the detector 35 the ejection mechanism 5 thrusts forward, pushing the striking element 13 towards the objects 1. The head of the piston 11 draws with it the guide 14 in its forward movement. Just so long as the surface 15 of the guide 14 remains against the stop-pin 17, the angular position of the axis 21 does not change. But at the moment when the striking element 13 has reached the position shown in FIG. 2, when the object 1 has been almost completely ejected from the conveyor belt 2, the guide 14 is at the point of transition between the substantially straight surface 15 and the oblique, or curved, surface 16 with regard to the stop-pin 17. At this point, the piston 10 has not reached the end of its travel and, moving farther forward, it causes the surface 16 to come into contact with the stop-pin 17 as the guide 14 is drawn forward by the head 11. The surface 16 lying at an obtuse angle to the axis 21, the ejection mechanism 5 is caused to pivot on the post 6 in the direction of the stop-piece 24, as indicated by the arrow 101 in FIG. 2.

Figure 3:
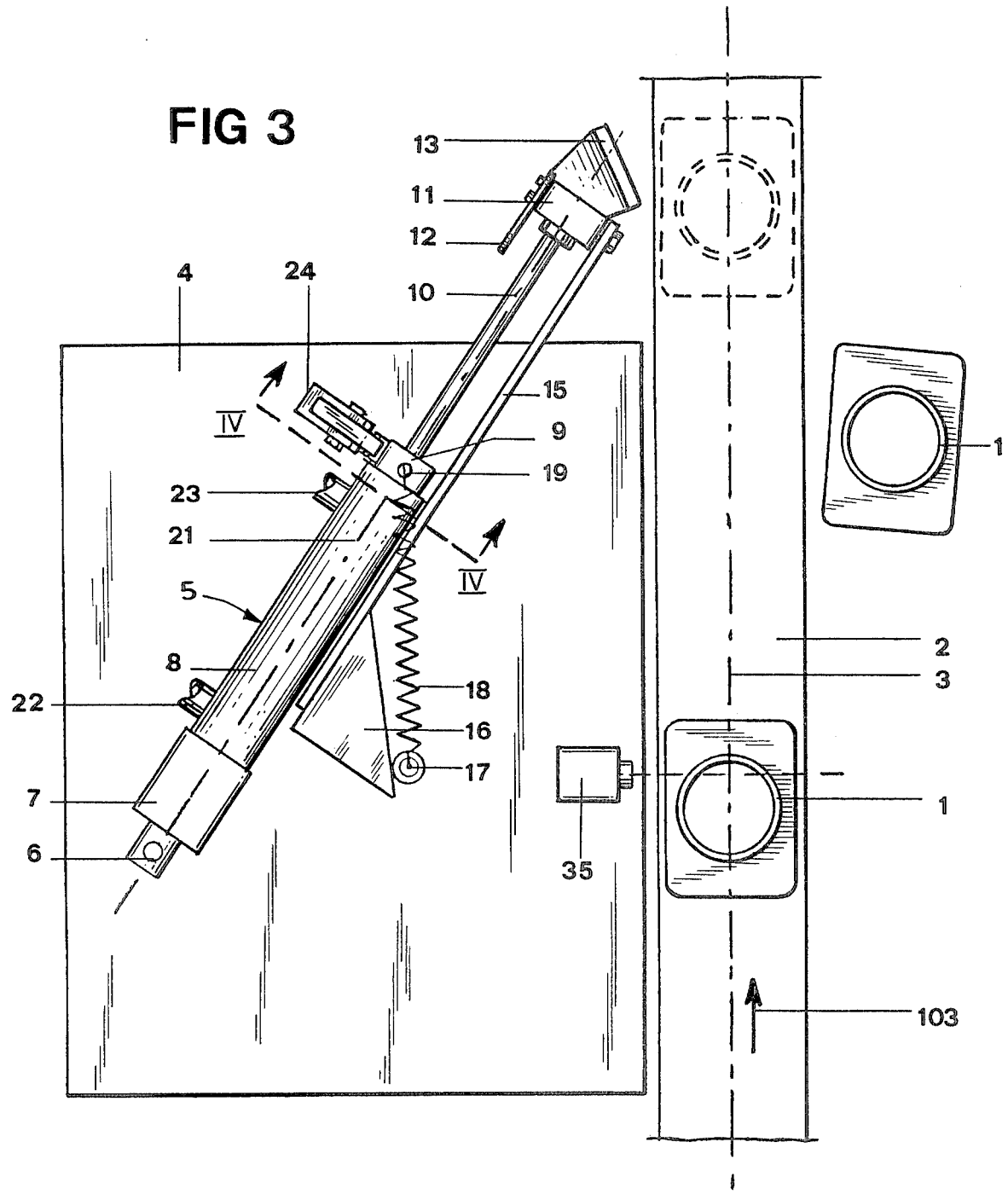

FIG. 3 shows the configuration of the device when the pivotal movement of the ejection mechanism 5 has been arrested by stop-piece 24 (hereinafter referred to as the "deflected position"). The piston 10 is at the end of its travel and the guide 14 is in contact with the stop-pin 17 at a point on the oblique surface 16 farthest away from the axis 21; the guide 14 no longer resting against the base 7 of the cylinder 8, the surface 15 of the guide 14 may act as a shock-absorber and reduces the pressure against stop-pieces 17 and 24. The return spring 18 is stretched to its maximum. It will be noticed that although the striking element 13 is at its farthest away from the post 6, it is not obstructing the path 3 of the objects 1. It will also be seen that the movement of the striking element 13, from its striking position as shown in FIG. 2 to its fully extended position in FIG. 3 follows the direction of travel of the conveyor belt 2.

The arrival of the ejection mechanism 5 against the stop-piece 24 triggers off the operations that return the mechanism to its home position against the stop-pin 17, as shown in FIG. 1. The mechanisms that carry out these operations are described hereinafter with reference to FIG. 5 to 9.

Figure 4:
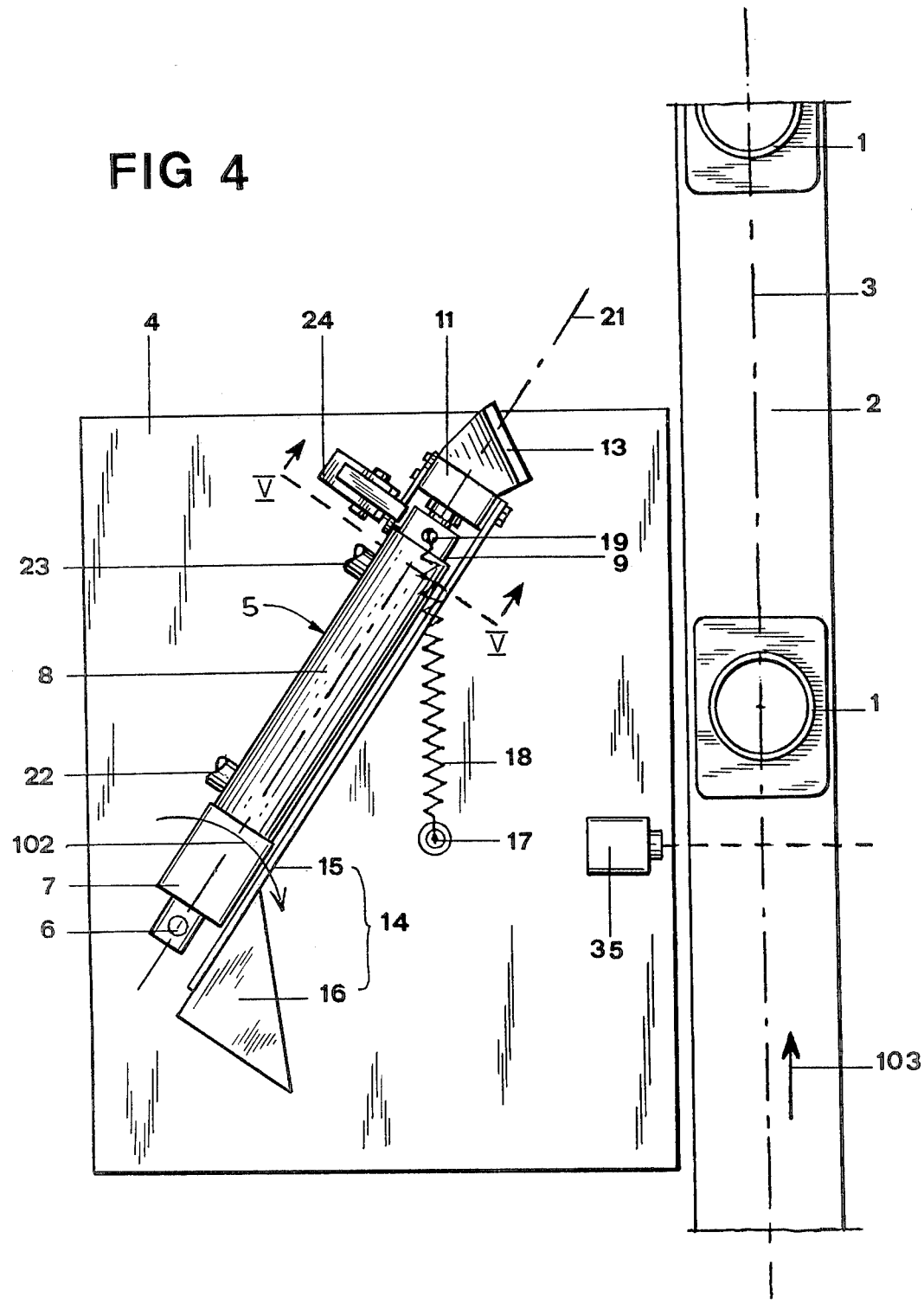
Figure 5:
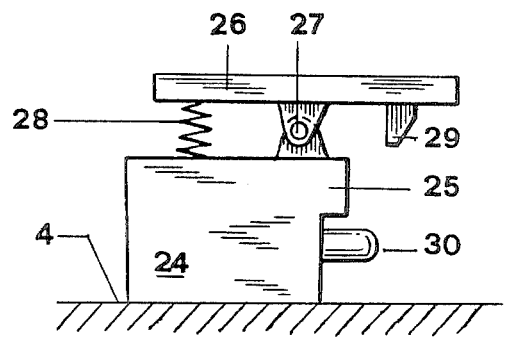
FIG. 5 is a side view of part of the device, seen from the point of view marked I in FIG. 2.
Figure 6:
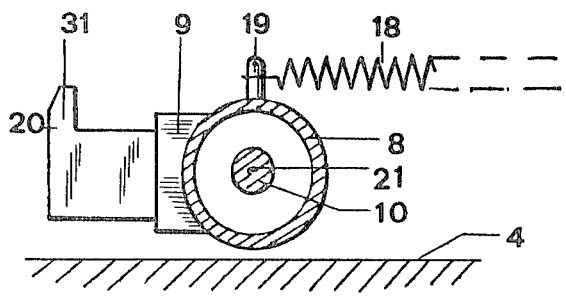
FIG. 6 is a side view of another part of the device, partially in cross section through line II of FIG. 2.

The stop-piece 24, which is firmly mounted on the base 4, contains a device that causes the return of the piston 10. This device, of which only the trigger 30 is shown in the drawings, is of a conventional type. In the rest position, the trigger 30 extends outwardly from the stop-piece 24; when depressed, it causes the mechanism situated within the stop-piece 24 to invert the direction of the compressed air and this causes the piston 10 to return to its point of departure. The trigger 30 is depressed as the surface 20 of the head 9 comes into contact with the buffer 25 of the stop-piece 24. At the same time as the piston 10 returns, the guide 14 ceases to press the surface 16 against the stop-pin 17, thus making it possible for the spring 18 to cause the pivotal return movement of the ejection mechanism 5, as shown by the arrow 102 of FIG. 4.

Figure 7:
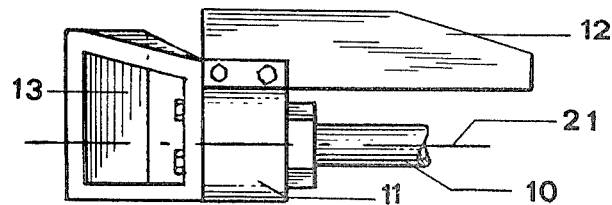
FIG. 7 is a side view of yet another detail, seen from the point of view marked III in FIG. 2.
Figure 8:
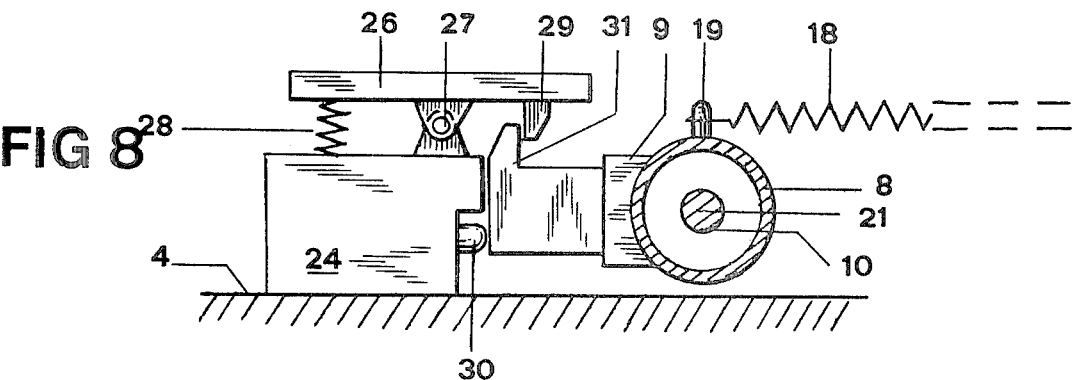
FIG. 8 is a side view, partially in cross section, through line IV of FIG. 3.
Figure 9:
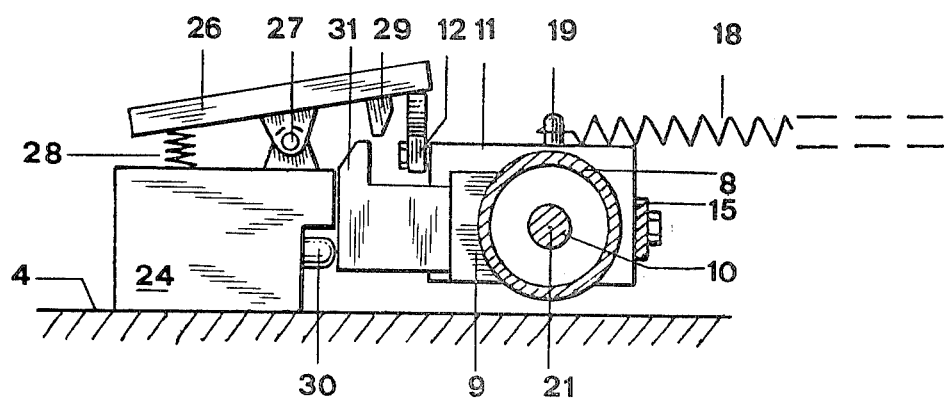
FIG. 9 is a side view, partially in cross section, through line V of FIG. 4.

In the more complicated form of embodiment shown in FIGS. 5 to 9, the stop-piece 24 is fitted with an arresting lever 26 that pivots on a fulcrum 27. At one end of the lever 26 is a catch 29 extending downwardly in a direction substantially at right angles to the axis of the lever 26; the other end rests on a return spring 28. At the moment when the surface 20 of the head 9 enters into contact with the buffer 25 of the stop-piece 24, the catch 39 engages a hook 31 on the side of the head 9 of the cylinder 8, as shown in FIG. 8. The catch 29 and hook 31 together constitute a locking device that keeps the ejecting mechanism 5 in the deflected position against stop-piece 24, despite the pull of the return spring 18.

To release this locking device, a release arm 12 is fixed to the head 11 of the piston 10, on the opposite side to the guide 14 (see FIG. 2 and 7). Thus the release arm 12 follows the movements of the piston 10. At the end of the piston's return travel, when the ejection mechanism 5 is still in the deflected position shown in FIG. 4, the release arm 12 passes under the lever 26 to release the catch 29 from the hook 31 (see FIG. 9). Then the return spring 18 can bring the ejection mechanism 5 back to its home position, as shown in FIG. 1, by a pivotal movement about the post 6 (see the arrow 102 in FIG. 4). It will be seen from FIG. 4 that when the piston 10 has completed its return movement, the oblique surface 16 of the guide 14 no longer touches the stop-pin 17. Only when the ejection mechanism 5 has returned to the home position (cf. FIG. 1) does the straight surface 15 of the guide 14 contact the stop-pin 17. This embodiment has the advantage of ensuring that the ejection mechanism 5 swings back to its home position only when the piston 10 has been completely retracted. In this way, the ejecting element 13 is sure to avoid hitting the objects 1 as it returns, even if the objects 1 are voluminous.

It will be clear from the foregoing description that the movements of the ejecting element 13 are jerky: the striking movement towards the object 1 is followed by the pivotal movement of the ejection mechanism 5 into the deflected position, which is followed by the return movement of the piston 10 and, finally, by the pivotal return of the ejection mechanism 5 to the home position. These movements are extremely rapid and precise so that the whole ejection operation can be carried out very quickly; consequently, it is possible to have the objects 1 on the conveyor belt 2 follow each other in very rapid succession.

It is clear that the return spring 18 may be replaced by any other kind of spring having a similar function and may be mounted on the base 4 at some point other than via stop-pin 17. It is equally clear that instead of a spring to bring the ejection mechanism 5 back to its home position, other means, such as a spiral spring mounted on the post 6 or a magnet or electro-magnet, permanent or intermittant, provided that the device is made of magnetic substance might be used; other means, such as a pneumatic or hydraulic system, or an electrically driven screw thread device might be used as well. Such a system or device could be controlled by means incorporated in the stop-piece 24 and triggered by the return of the release lever 12 as piston 10 is retracted.

We claim:

1. Apparatus for ejecting objects from a conveyor line surface of the kind in which three-dimensional objects pass one by one through the field of a detecting device and are ejected as a result of a signal from the detecting device, this ejection taking place by means of an ejecting mechanism comprising at least one motor element firmly mounted on a fixed base and a retractable striking element impelled by the motor element characterized by the fact that the motor element is pivotally mounted on a firm base to pivot between a home position, in which the striking element is retracted, and a deflected position in which the striking element, extended to the full, is carried out of the path of the said objects, the movement of the striking element from the striking position to the deflected position following the direction of travel of the objects, means being provided to return the motor element to its home position.

2. Apparatus as claimed in claim 1 characterized by the fact that the home position of the motor element is determined by a stop-in firmly upstanding from the base.

3. Apparatus as claimed in claim 2 characterized by the fact that the ejection mechanism comprises a guide that moves the striking element, impelled by the motor element, and slides between the motor element and the stop-in, the guide having a straight surface substantially parallel to the line of travel of the striking element and an oblique or curved surface forming an obtuse angle with the straight surface, the straight surface contacting the stop-pin when the striking element is between the retracted position and the striking position, the oblique or curved surface contacting the stop-pin forcing the motor element to pivot towards the deflected position when the striking element is extended beyond the striking position.

4. Apparatus as claimed in claim 1 characterized by the fact that it comprises a stop-piece firmly upstanding from the base that determines the deflected position of the motor element.

5. Apparatus as claimed in claim 4 characterized by the fact that it also comprises a locking device of which part is integral with the stop-piece and part integral with the motor element, the locking device retaining the motor element against the stop-piece, and that it also comprises a release device integral with the striking element which separates the two parts of the locking device when the striking element has been retracted.

6. Apparatus as claimed in claim 4 characterized by the fact that it comprises a device triggering the return of the striking element, sensitive to the contact of the motor element against the stop-piece.

7. Apparatus as claimed in claim 1 characterized by the fact that it comprises, upstanding from the base, a post from which the end of the motor element opposite to the striking element is suspended and on which it pivots.

8. Apparatus as claimed in claim 2 characterized by the fact that when the ejection mechanism is in its home position, the longitudinal axis of the direction of travel of the striking element forms an acute angle with the direction of travel of the objects.

9. Apparatus as claimed in claim 7 characterized by the fact that the conveyor line surface on which the objects travel is substantially level and that the post on which the motor element pivots is substantially at a right angle to the plane of the conveyor line surface.

10. Apparatus in claim 2 characterized by the fact that the return device comprises a return spring fixed to the base, on the one hand, and to the motor element, on the other hand.

* * * * *

UNITED STATES PATENT AND TRADEMARK OFFICE
CERTIFICATE OF CORRECTION

PATENT NO. : 4,256,216
DATED : March 17, 1981
INVENTOR(S) : Thomas B. Winters, et al.

It is certified that error appears in the above—identified patent and that said Letters Patent are hereby corrected as shown below:

Column 1, line 29, "of" should read --or--.

Column 4, line 13, "39" should read --29--.

Column 5, at line 3 of Claim 2, "stop-in" should read --stop-pin--.

Column 5, at line 3 of Claim 3, after "moves", insert --with--.

Column 5, at line 5 of Claim 3, "stop-in" should read --stop-pin--.

Column 5, at line 11 of Claim 3, after "stop-pin" insert --and--.

Signed and Sealed this

Second Day of June 1981

[SEAL]

Attest:

RENE D. TEGTMEYER

Attesting Officer    Acting Commissioner of Patents and Trademarks